United States Patent
Rice et al.

(10) Patent No.: US 12,040,847 B2
(45) Date of Patent: Jul. 16, 2024

(54) MEASURING AND ANALYZING DATA TO GENERATE RECOMMENDATIONS ASSOCIATED WITH A DIGITAL SUBSCRIPTION LINE (DSL)

(71) Applicant: VIAVI SOLUTIONS INC., San Jose, CA (US)

(72) Inventors: John Janvier Rice, Buena Vista, VA (US); James Patrick Perdue, Roanoke, VA (US)

(73) Assignee: VIAVI SOLUTIONS INC., San Jose, CA (US)

( * ) Notice: Subject to any disclaimer, the term of this patent is extended or adjusted under 35 U.S.C. 154(b) by 147 days.

(21) Appl. No.: 17/399,858

(22) Filed: Aug. 11, 2021

(65) Prior Publication Data
US 2023/0046134 A1    Feb. 16, 2023

(51) Int. Cl.
| | |
|---|---|
| H04B 3/487 | (2015.01) |
| H04B 3/32 | (2006.01) |
| H04L 1/00 | (2006.01) |
| H04M 3/30 | (2006.01) |
| H04M 11/06 | (2006.01) |

(52) U.S. Cl.
CPC ............ *H04B 3/487* (2015.01); *H04B 3/32* (2013.01); *H04L 1/0057* (2013.01); *H04M 3/304* (2013.01); *H04M 11/062* (2013.01)

(58) Field of Classification Search
CPC ......... H04B 3/487; H04B 3/32; H04L 1/0057; H04M 11/062
See application file for complete search history.

(56) References Cited

U.S. PATENT DOCUMENTS

| | | | |
|---|---|---|---|
| 2008/0292021 A1* | 11/2008 | Lv | H04M 11/062 375/295 |
| 2010/0150318 A1* | 6/2010 | Irenze | H04L 43/50 379/21 |
| 2018/0027113 A1* | 1/2018 | Mohseni | H04L 41/0631 379/22.04 |
| 2023/0035180 A1* | 2/2023 | Delaby | H04B 3/48 |

\* cited by examiner

*Primary Examiner* — Yaotang Wang
(74) *Attorney, Agent, or Firm* — MANNAVA & KANG, P.C.

(57) ABSTRACT

According to examples, a system for measuring and analyzing data to generate recommendations associated with a digital subscription line (DSL). Data associated with a DSL is measured according to one or more performance counters. The data is analyzed with respect to one or more thresholds and an anomalous performance event is determined. Also, a recommendation with respect to an performance issue associated with the anomalous performance event is provided.

20 Claims, 12 Drawing Sheets

110

111 — Common to ADSL/VDSL/Gfast
Directional
- Actual Rate
- Max Rate
- Capacity
- Margin
- Serial attenuation
- Line attenuation
- Tx Power
- INTLV Delay
- Actual INP
- RTX Status
- RTX-TX
- RTX-C
- RTX-UC
- INP REIN
- Forward error correction
- Forward error correction/Min
- Cyclic redundancy check
- Cyclic redundancy check/Min
- ES
- SES
- UAS
- Loss of frame
- Loss of signal
- LOM

112 — Non-Directional
- Transport
- Path
- Est Line Length
- xTU-R SW Rev
- xTU-O PHY Rev
- xTU-O Vendor
- xTU-O Rev

113 — VDSL Only
Non-Directional
- Vectoring
- ELE (kl0)

114 — Per-Band
- Serial attenuation
- Line attenuation
- Margin
- Transmission Power

115 — Gfast Only
Sckipio Only
- ETR
- TIGA
- Bitswaps

116 — BDCM & SCK
- Aggregate Rate
- SRA
- FRA

User Specified Thresholds – Recommendation text

| Pair 1 Upstream 27 CRC exceeds threshold (>15)<br>Pair 1 Upstream 376 FEC exceeds threshold (>150)<br>Pair 1 Downstream 538 FEC exceeds threshold (>150)<br>Pair 2 Upstream 46 CRC exceeds threshold (>15)<br>Pair 2 Downstream 227 FEC exceeds threshold (>150) | 121 |

| Suggest checking the graphs for dips in the BPT, SNR, and QLN graphs.<br>Check that the pair(s) under test:<br>Are securely connected at the termination point<br>Insulation is free from nicks or other signs of wear<br>Twisted per required specifications.<br>If present, inspect and replace scotch locks as needed<br>Check that the outside plant cabling is properly grounded and bonded.<br>Check pair balance by running the Balance copper measurement. | 122 |

| Run these copper measurements with technology set to ADSL2+<br>Noise<br>Impulse Noise<br>Impulse Noise Capture<br>Spectral | 123 |

FIG. 1E

130
Bonded pairs (ADSL) – Recommendation text

Pair 1 Upstream 27 Cyclic redundancy check exceeds threshold (>15)
Pair 1 Upstream 376 Forward error correction exceeds threshold (>150)
Pair 1 Downstream 538 Forward error correction exceeds threshold (>150)
Pair 2 Upstream 46 Cyclic redundancy check exceeds threshold (>15)
Pair 2 Downstream 227 Forward error correction exceeds threshold (>150)

131

Suggest checking the graphs for dips in the BPT, signal to noise, and QLN graphs.
Check that the pair(s) under test:
Are securely connected at the termination point
Insulation is free from nicks or other signs of wear
Twisted per required specifications.
If present, inspect and replace scotch locks as needed
Check that the outside plant cabling is properly grounded and bonded.
Check pair balance by running the Balance copper measurement.

132

Run these copper measurements with technology set to Asymmetric digital subscriber line 2+
Noise
Impulse Noise
Impulse Noise Capture
Spectral

Bonded pairs (VDSL) – Recommendation text

| |
|---|
| Pair 1 Upstream 376 Forward error correction exceeds threshold (>150)<br>Pair 2 Downstream 227 Forward error correction exceeds threshold (>150)<br>Digital subscription line (DSL) Expert has detected the pairs have connected with different Very fast digital subscriber line profiles<br>Verify the port provisioning is correct. — 141 |
| Suggest checking the graphs for dips in the BPT, signal to noise, and QLN graphs.<br>Check that the pair(s) under test:<br>Are securely connected at the termination point<br>Insulation is free from nicks or other signs of wear<br>Twisted per required specifications.<br>If present, inspect and replace scotch locks as needed<br>Check that the outside plant cabling is properly grounded and bonded.<br>Check pair balance by running the Balance copper measurement. — 142 |
| Run these copper measurements with technology set to Very fast digital subscriber line 30MHz<br>Noise<br>Impulse Noise<br>Impulse Noise Capture<br>Spectral — 143 |

Gfast User Specified Thresholds – Recommendation text

Pair 1 Upstream 27 Cyclic redundancy check exceeds threshold (>15)
Pair 1 Downstream 538 Forward error correction exceeds threshold (>150)
Pair 2 Upstream 46 Cyclic redundancy check exceeds threshold (>15)
(List all results for both pairs, that have crossed their respective thresholds here, not bulleted)

151

Suggest checking the graphs for dips in the BPT, signal to noise, and QLN graphs.
Check that the pair(s) under test:
Are securely connected at the termination point
Insulation is free from nicks or other signs of wear
Twisted per required specifications.
If present, inspect and replace scotch locks as needed
Check that the outside plant cabling is properly grounded and bonded.
Check pair balance by running the Balance copper measurement.

MEASURING AND ANALYZING DATA TO GENERATE RECOMMENDATIONS ASSOCIATED WITH A DIGITAL SUBSCRIPTION LINE (DSL)

TECHNICAL FIELD

This patent application relates generally to measuring and analyzing data associated with digital subscription lines (DSLs), and more specifically, to a test device and methods for measuring performance of a DSL, analyzing the measurement data with respect to one or more thresholds, determining an anomalous performance event associated with the DSL, and providing a recommendation with respect to a performance issue associated with the anomalous performance event.

BACKGROUND

DSL technology allows digital data to be transmitted over telephone lines. DSL service can be delivered simultaneously with wired telephone service on the same telephone line (e.g., over standard copper pair facilities) since DSL typically uses higher frequency bands for data transmission.

Although it is becoming increasingly popular to transmit data using high-bandwidth fiber-optic cable, installation of these fiber-optic cables is extremely cumbersome and expensive. Furthermore, because DSL service may be employed over existing copper-based cables, DSL is still widely used and advancements in DSL technologies continue to persist. However, testing copper-based cables remains a challenge.

DSL maintenance and repair are typically done by technicians that are required to go to the customer premises to diagnose and repair DSL performance issues. In some cases, these technicians may have been employed for many years, and as such, may be familiar with common issues that arise in DSL maintenance.

However, hi many instances, technicians do not have the experience or knowledge to remediate performance issues of a DSL, For example, an inexperienced technician may call an expert when he or she may be unable to find a solution for a DSL issue, resulting in further delay and expense, as well as extended service degradation from the customer's point of view. As a result, the process of diagnosing and repairing DSL performance issues is often drawn-out, inefficient and costly.

BRIEF DESCRIPTION OF DRAWINGS

Features of the present disclosure are illustrated by way of example and not limited in the following figures, in which like numerals indicate like elements. One skilled in the art will readily recognize from the following that alternative examples of the structures and methods illustrated in the figures can be employed without departing from the principles described herein.

FIG. 10 illustrates a block diagram of a memory component in a testing device, according to an example.

DETAILED DESCRIPTION

Figure 1A:
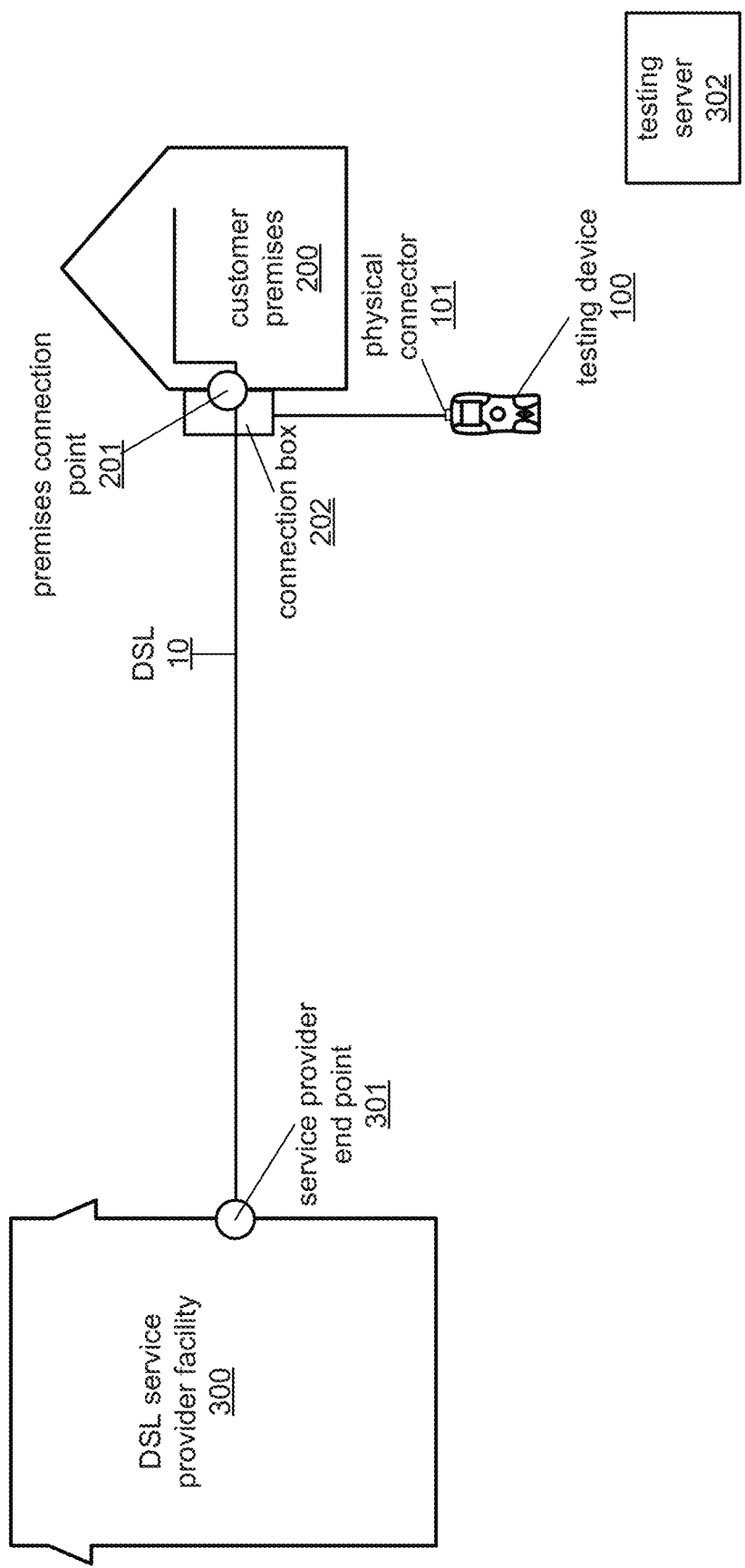
FIG. 1A illustrates a block diagram of a system environment, including a testing device, that may be implemented for measuring and analyzing data for generating recommendations associated with a DSL, according to an example.

For simplicity and illustrative purposes, the present application is described by referring mainly to examples thereof. In the following description, numerous specific details are set forth in order to provide a thorough understanding of the present application. It will be readily apparent, however, that the present application may be practiced without limitation to these specific details. In other instances, some methods and structures readily understood by one of ordinary skill hi the art have not been described in detail so as not to unnecessarily obscure the present application. As used herein, the terms "a" and "an" are intended to denote at least one of a particular element, the term "includes" means includes but not limited to, the term "including" means including but not limited to, and the term "based on" means based at least in part on.

1. Overview

A testing device, according to an example of the present disclosure, can connect to a DSL and perform tests on the DSL. The testing device can analyze measurement data and output a procedure or recommendations that can be performed by a technician to remediate performance anomalies in the DSL that were detected from the measurement data. It should be appreciated that examples of the present disclosure may be directed to other communication and transmission technologies as well as DSL.

In some examples, the testing device may measure data from a DSL according to one or more performance counters and may analyze the measurement data according to one or more thresholds. In these examples, if any threshold values associated with the performance counters are met, the testing device determines an anomalous performance event has occurred and generates a user interface (UI) notification element to indicate presence of the anomalous performance event, hi some examples, the thresholds may be user-defined, while in other examples, the thresholds may be generated based on the measured performance counters. In addition, an analysis mode may be enabled that, among other things, analyzes one or more measured performance counters, implements testing protocols, and utilizes key performance indicators (KPIs) to generate a recommendation with respect to a performance issue associated with the anomalous performance event. In some examples, the UI notification element may include troubleshooting steps directed to addressing and/or remediating the performance issue.

DSL maintenance and repair may typically be done by dedicated technicians. Testing devices utilized by these technicians may typically measure data from a DSL, but may not be capable of providing any analysis associated with the captured measurements. Consequently, in many instances, a technician may be unable to determine a cause of a performance issue with the DSL. Furthermore, in many cases, these technicians may have become familiar with common issues in DSL maintenance, but may not always be able to respond to issues that require greater knowledge or expertise, such as those that may require knowledge of signal analysis. Also, in many instances, more knowledgeable and experienced technicians may be being replaced by newer technicians who may be less equipped to deal with issues that may arise. Another issue limiting effectiveness of DSL technicians may relate to workforce segmentation. That is, technicians specializing in maintenance and repair of copper-wire "telephone" connections may have different expertise(s) than technicians specializing in maintenance and repair of modem-based DSL connections. Devices and equipment utilized by these technicians may be different as well. Consequently, technicians for copper-wire and modem-based connections have remained segmented, and testing devices that may be applicable to both remain unavailable.

Systems and methods and the testing device, according to examples of the present disclosure, provide an event-based monitoring and analysis that can utilize connection line measurement data to flag an anomalous performance event. Also, information (e.g., measurement data) associated with the anomalous performance event is analyzed and a recommendation to address a performance issue in a DSL is generated and displayed. For example, a DSL technician may utilize the event-based monitoring and analysis of the testing device to measure and analyze aspects of both copper-wire and modem-based connections, and the testing device generates and displays recommendations that incorporate analysis from both connection types. In other examples, a DSL technician may utilize the event-based monitoring and analysis of the testing device to determine a source or a location of performance issue in a DSL, without requiring signal analysis by the DSL technician. Accordingly, the systems and methods and testing device described herein may increase technician efficiency and reduce resolution times for DSL performance issues.

2. Systems and Testing Device

Figure 1B:
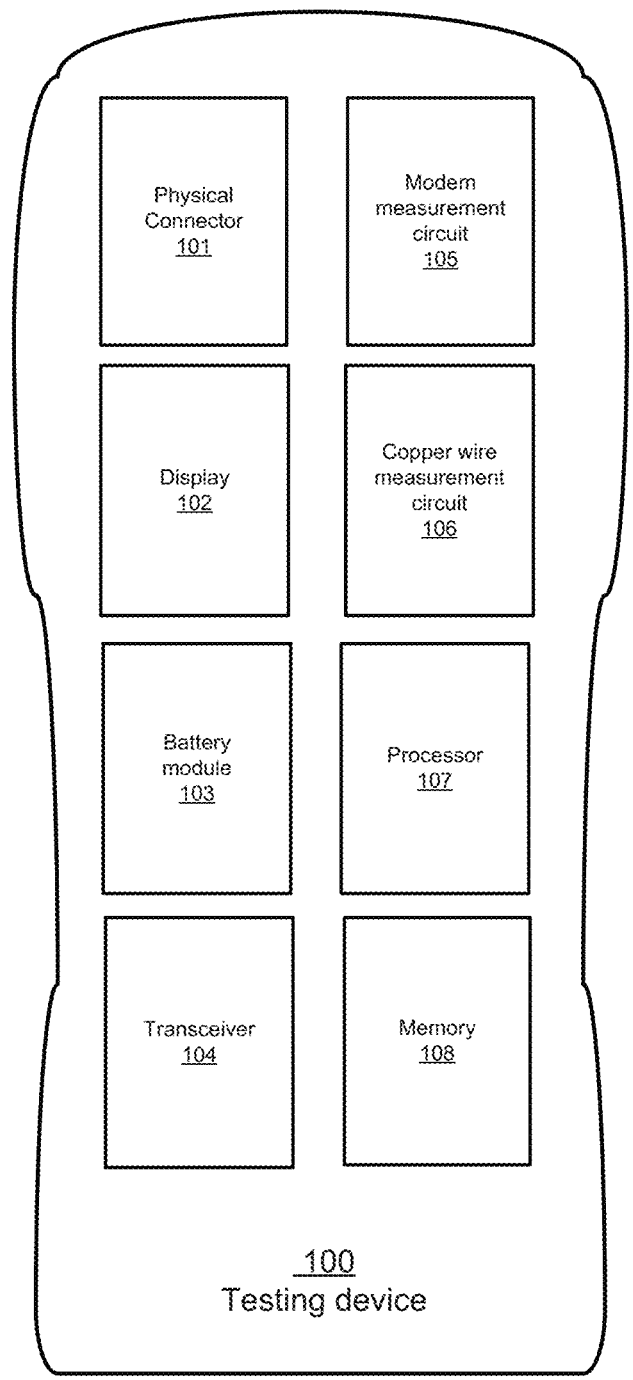
FIG. 1B illustrates a block diagram of a testing device, according to an example.
Figure 1C:
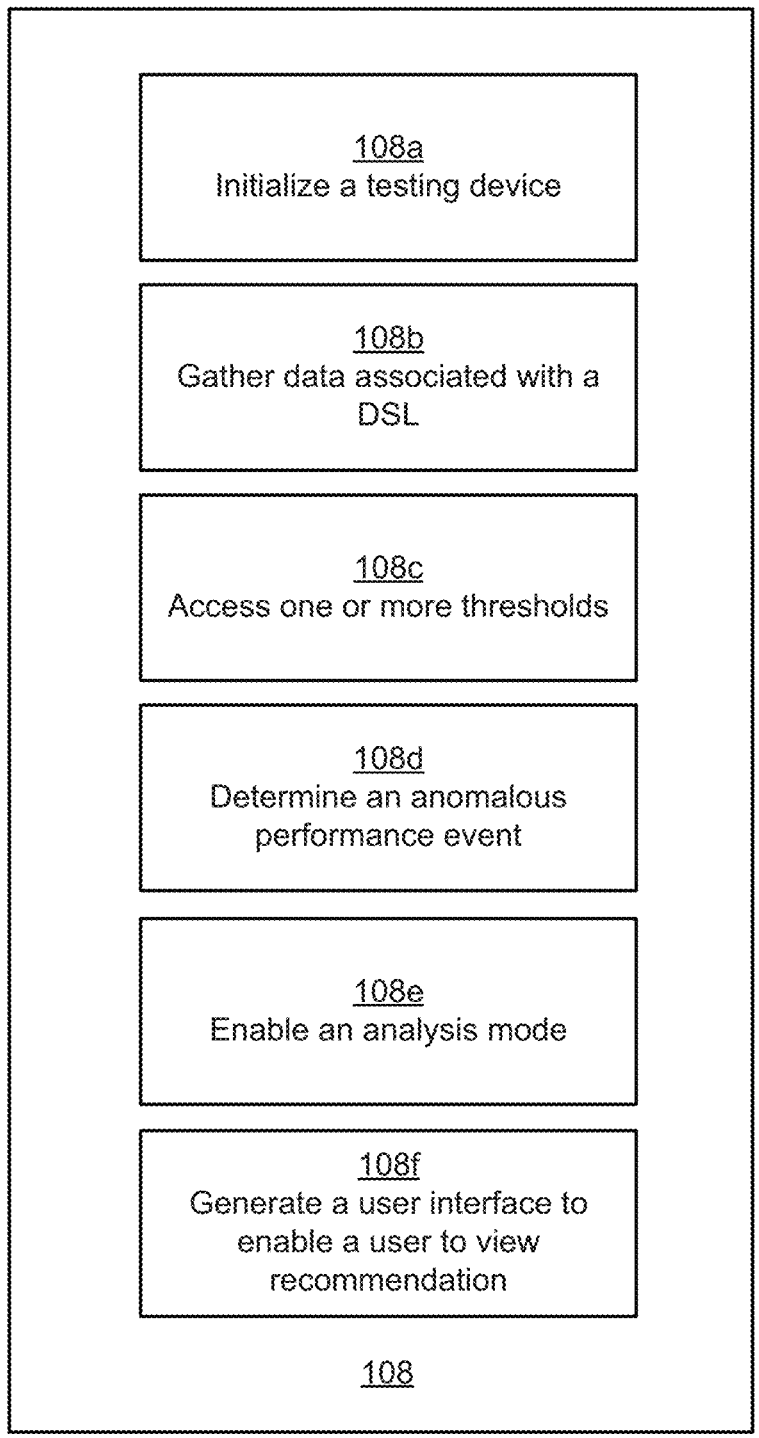
FIG. 1D illustrates a listing of performance counters that may be measured by a testing device, according to examples.
FIGS. 1E-H illustrate listings of recommendation text that may be measured by a testing device, according to examples.

FIG. 1A illustrates a block diagram of a system environment, including a testing device that may be implemented for measuring and analyzing data for generating recommendations associated with a DSL, according to an example. FIG. 1B illustrates a block diagram of the testing device, according to an example. FIG. 1C illustrates a block diagram of a memory component in the testing device, according to an example, FIG. 1D illustrates a listing of performance counters that may be measured by the testing device, according to an example. FIGS. 1E-H illustrate listings of recommendations that may be provided by the testing device, according to an example, FIG. 1A illustrates an example wherein a DSL line 10 is connected between a DSL service provider end point 301 provided at a DSL service provider facility 300 for DSL and a premises connection point 201 provided at a customer premises 200. DSL is part of a broadband access technology that may enable high-speed data transmission over existing copper telephone wires, which may connect from customer premises equipment (CPE) (e.g., a DSL modem) to the local telephone company's central office (e.g., the DSL service provider facility 300). According to examples, the DSL modem may implement symmetric digital subscriber line (SDSL) modem or an asymmetric digital subscriber line (ADSL) modem.

The service provider facility 300 may include a service provider end point 301. In some examples, the service provider end point 301 may be a Digital Subscriber Line Access Multiplexer (DSLAM). In these examples, the DSLAM is an access device at a service providers central location that may link many customer DSLs (e.g., the DSL 10) to a high-speed backbone line that may connect the customers to the Internet and/or provide other broadband services.

In some examples, the premises connection point 201 is shown to represent a connection point for DSL 10 at the customer premises 200. In some examples, the DSL 10 may be connected through wiring at the customer premises 200 to a DSL modem, which in turn may be connected to other CPE, such as a laptop, smartphone, etc., at the customer premises 200 for Internet access or to provide other broadband services. In an example, the premises connection point 201 is provided in a connection box 202 located on the outside of the customer premises 200 that may allow the testing device 100 to physically connect to wires of the DSL 10 at the customer premises 200. For example, the testing device 100 may include physical connector 101 to connect to copper wires of DSL 10. It will be apparent to one of ordinary skill in the art that the testing device 100 may connect to DSL 10 at locations other than the connection box 202 to take measurements associated with performance counters of the DSL 10.

The testing device 100 may be configured to, among other things, take measurements associated with the DSL 10. In some examples, DSL data generated from the measurements may be analyzed and anomalous events that may be representative of DSL service issues may be identified, and the testing device 100 is operable to generate recommendations including remedial operations for fixing the DSL service issues.

In some examples, the testing device 100 may be a mobile device. In an example, the testing device 100 may embody a smaller) form factor, such as a handheld testing device, that can be utilized by a technician deployed to the site to facilitate DSL repair and maintenance.

In some examples, the testing device 100 may also connect to a remote device for performing various operations associated with measuring, testing, analyzing and fixing problems associated with DSL. In an example, the remote device may include testing server 302 connectable to the testing device 100 via a wired and/or wireless connection. In an example, the testing server 302 may be provided at the service provider facility 300, However, the testing server 302 may be provided at a location other than the service provider facility 300.

Also, in some examples, the testing server 302 may include any number of servers, hosts, systems, and/or databases that store data to be accessed by the system 100 and/or other network elements (not shown) in the system environment. In addition, in some examples, the servers, hosts, systems, and/or databases of the testing server 302 may include one or more storage mediums storing any data, hi other examples, the testing server 302 may be utilized by a service provider providing DSL-related services to store any information relating to measuring, testing and repair services.

It should be appreciated that one or more of the testing device 100 and the testing server 302 may or may not include additional features, and some of the features described herein may be removed and/or modified without departing from the operations described herein. Furthermore, while the servers, systems, subsystems, and/or other computing devices shown in FIGS. 1A-C may be shown as single components or elements, it should be appreciated that one of ordinary skill in the art would recognize that these single components or elements may represent multiple components or elements, and that these components or elements may be connected via one or more networks, Other types of servers, middleware, systems, platforms, and applications (not shown) may also be provided at the front-end or back-end to facilitate the features and functionalities described herein.

Also, the testing device 100 and the testing server 302 may communicate with one or more other devices via a wired or wireless network (not shown), The network may be a local area network (LAN), a wide area network (WAN), the Internet, a cellular network, a cable network, a satellite network, or other network that facilitates communication between these devices and systems.

FIG. 1B shows an example of the testing device 100. In this example, the testing device 100 may include, among other things, a physical connector 101, a display 102, a battery module 103, a transceiver 104, a modem measurement circuit 105, a copper wire measurement circuit 106, processor 107 and memory 108. In some examples, the physical connector 101 may enable the testing device 100 to connect (e.g., "clip on") to copper wiring of the DSL 10 and to capture measurement data. The display 102 may include a touch screen or non-touch screen display for user input and/or output, and may visually display digital data, such as measurement readouts from a DSL. Also, the testing device 100 may include a keypad (not shown) for user input. The battery module 103 may supply electrical power to power testing device 100. The transceiver 104 may transmit and receive data wirelessly. The modem measurement circuit 105 may measure modem data from the DSL 14. The copper wire measurement circuit 106 may measure copper wire data from the DSL 10.

In some examples, the processor 107 may execute the machine-readable instructions stored in the memory 108. It should be appreciated that the processor 107 may be a semiconductor-based microprocessor, a central processing unit (CPU), an application specific integrated circuit (ASIC), a field-programmable gate array (FPGA), and/or other suitable hardware device. In some examples, the processor 107 may be configured to access modem data, while in other examples, the testing device may include a dedicated (i.e., distinct) modem processor to access modem data.

In some examples, the memory 108 may have stored thereon machine-readable instructions (which may also be termed computer-readable instructions) that the processor 107 may execute. The memory 108 may be an electronic, magnetic, or other physical storage device that contains or stores executable instructions. The memory 108 may be, for example, Random Access memory (RAM), an Electrically Erasable Programmable Read-Only Memory (EEPROM), a storage device, or the like. The memory 108, which may also be referred to as a computer-readable storage medium, may be a non-transitory machine-readable storage medium, where the term "non-transitory" does not encompass transitory propagating signals. It should be appreciated that the memory 108 depicted in FIG. 10 may be provided as an example. Thus, the memory 108 may or may not include additional features, and some of the features described herein may be removed and/or modified without departing from the scope of the memory 108 outlined herein. It should be appreciated that, and as described further below, the processing performed via the instructions on the memory 108 may or may not be performed. In part or in total, with the aid of other information and data, such as information and data provided by the testing device 100 and/or the testing server 302.

In some examples, the memory 108 may store instructions, which when executed by the processor 107, may cause the processor to: initialize a testing device 108a; gather measurement data associated with a DSL 108b; and access performance counters for a DSL 108c. In addition, the instructions, when executed by the processor 107, may further cause the processor to determine an anomalous performance event 108d; enable an analysis mode to determine an issue and generate a recommendation 108e; and generate a UI to enable a user to view the recommendation 108f.

In some examples, the instructions 108a may initialize a testing device prior to testing. That is, in some examples, the instructions 108a may ensure internal variables are in a known state and determine any physical impairments. In some examples, to initialize the testing device, the instructions 108a may connect with a back-end device, such as the testing server 302.

In some example, the instructions 108b may gather measurement data associated with a DSL. As used herein, "measurement data" may include any data associated with the DSL being measured by the testing device 100. In some examples, upon connection of a physical connector (e.g., the physical connector 101) to the DSL, the instructions 108b may gather measurement data associated with one or more performance counters.

Example performance counters may include upstream and/or downstream cyclic redundancy check (CRC), upstream and/or downstream forward error correction (FEC), upstream and/or downstream errored seconds (ES) and upstream and/or downstream uncorrected retransmitted DTU (data transfer units) (RtX-UC). Other performance counters may include upstream and/or downstream severely errored seconds (SES), upstream and/or downstream unavailable seconds (UAS), upstream and/or downstream loss of frame (LOF), upstream and/or downstream loss of signal (LOS), upstream and/or downstream loss of margin (LOM). In addition, performance counters associated with copper wire measurements, such as noise, impulse noise, impulse noise capture, and spectral measurement may be gathered via the instructions 108b as well. FIG. 1D illustrates a listing of performance counters 110 that may be measured via the instructions 108b. In this example, the listing of performance counters may include performance counters 111 common to an asymmetric digital subscriber line (ADSL), a very high-speed digital subscriber line (VDSL), and a G.fast directional digital subscriber line. In addition, the listing of performance counters may include non-directional performance counters 112, a very high-speed digital subscriber line (VDSL) only non-directional performance counters 113, per-band performance counters 114, a G.fast directional digital subscriber line-only Sckipio only performance counters 115 and BDCM and SCK performance counters 116. FIG. 1D further illustrates further performance counters, including interleaving delay (INTLV Delay), count of retransmitted DTUs (data transfer units) (RTX-TX), count of successfully corrected data transfer units (RTX-C), count of errored data transfer units (DTUs) that were not retransmitted within the maximum delay configured on the connection (RTX-UC), a number of consecutive discrete multi-tone (DMT) signals that have been corrupted by REIN (Repetitive Electrical Impulse Noise), a test instruments chipset top level software revision (xTU-R SW Rev), a far-end (Digital-Subscriber-Line-Access-Multiplexer (DSLAM) or data processing unit (DPU)) low level chipset revision information (xTU-O PHY Rev) a far-end (Digital-Subscriber-Line-Access-Multiplexer (DSLAM) or data processing unit (DPU)) chipset vendor ID (xTU-O Vendor), a far-end (Digital-Subscriber-Line-Access-Multiplexer (DSLAM) or data processing unit (DPU)) chipset revision information (xTU-O Rev), an electrical length estimation (ELE), an expected throughput (ETR), a count of transmitter initiated gain adjustments (TIGA), a count of seamless rate adaption (SRA) events that have occurred on the connection, and a count of Fast Rate Adaption (FRA) events that have occurred on the connection.

To gather measurement data related to a modem connection of the DSL, the instructions 108b may utilize a modern measurement circuit, such as the modem measurement circuit 105. To gather measurement data related to copper wire connections of the DSL, the instructions 108b may utilize a copper wire measurement circuit, such as the copper wire measurement circuit 106.

In some examples, the instructions 108c may access one or more thresholds associated with performance counters. In some examples, the thresholds may be user-defined (e.g., by a technician or service provider), In other examples, the thresholds may be analysis-based, wherein the instructions 108c may generate thresholds based on, for example, performance counters being utilized. In these examples, the one or more thresholds may be utilized to determine anomalous performance events during operation of the DSL.

In some examples, the instructions 108d may determine an anomalous performance event with a performance counter. As used herein, an "anomalous performance event" may include any event that may cause a performance counter to a threshold to be met. In some examples, to determine an anomalous performance event, the instructions 108d may compare incoming performance counter values with associated thresholds, wherein if the threshold is met, the event may be determined to be an anomalous performance event. In some examples, the instructions 108d may perform the comparisons continually during connection, while in other examples, the instructions 108d may perform the comparisons upon request by a user. Upon determining an anomalous performance event with a performance counter, the instructions 108d may also generate a notification element an "alert") for display on a display, such as the display 102. In some examples, the notification element may be a "flag" icon, such as a '!', which may be displayed in a listing of measured performance counters.

In some examples, upon determining an anomalous performance event, the instructions 108e may enable an analysis mode. In some examples, the analysis mode may be referred to as "DSL expert". In some examples, the analysis mode may (among other things) analyze measurement data associated with one or more performance counters, implement one or more testing protocols to determine a testing protocol result, and may analyze (e.g., compare) key performance indicators (KPIs) to the testing protocol result to determine a performance issue and generate a recommendation associated with a DSL. As used herein, a "performance issue" may include any issue on the DSL that may be causing undesirable performance of the DSL.

In some examples, to enable the analysis mode, the instructions 108e may provide a selectable button on a display of the testing device 100. In other examples, the instructions 108e may cause the analysis mode to run continuously upon connecting the testing device 100 to the DSL.

In some examples, an analysis mode enabled via the instructions 108e may utilize one or more testing protocols to determine an performance issue. Example testing protocols may relate to copper wire connections of a DSL and modem lines or connections of the DSL. Example testing protocols may include, among others, testing protocols related to ADSL (asymmetrical digital subscriber line), VDSL (very high-speed digital subscriber line) and G.fast protocols. The testing protocols may, in some examples, employ any number of associated key performance indicators (KPIs). In particular, the testing protocols may, in some cases, compare a testing protocol result (e.g., based on a performance counter) to a KPI, such as one or more of the performance counters listed in FIG. 1D, to analyze information relating to an anomalous performance event and to determine a performance issue with the DSL.

In some examples, the testing protocols may analyze a performance issue with a modem line, and "follow" the issue "through the DSL layer stack" to determine a (physical) performance issue with a copper connection of a DSL, thereby providing combined analysis of both copper-wire and modem-based connections of the DSL. That is, for example, the instructions 108e may implement an analysis sequence whereby a performance issue with a modem-based connection in the DSL may be "followed" to determine an associated performance counter associated with a copper line connection, and then determine a (corresponding) physical performance issue with the copper line connection.

Furthermore, in some examples, as part of an analysis mode, the instructions 108e may utilize measurement data to generate one or more data graphs. In these examples, to determine an performance issue with the DSL, the instructions 108e may analyze aspects of the one or more data graphs. In particular, in some examples, the instructions 108e may analyze measurement data associated with one or more features found in the one or more data graphs (also referred to as "feature data"). Examples of the one or more features found in the one or more data graphs may include a "dip' or pike" in the data graph, curve in the data graph or a "length" in the data graph. So, in some examples, the instructions 108e may analyze a depth of a "dip" on the data graph, a shape of a "dip" on the data graph, and/or where a "dip" may be located along a range/axis of a data graph to determine a performance issue (e.g., noise, distance/loss, etc.) with the DSL. It should be appreciated that to determine a performance issue, the instructions 108e may implement various fuzzy logic, machine-learning (ML) and artificial intelligence (AI) techniques.

In some examples, the instructions 108e may generate a recommendation in response to a performance issue. So, in some examples, the instructions 108e may analyze the performance issue as discussed, and may generate a corresponding recommendation to address the performance issue. In some examples, the recommendation may include recommendation text suggesting troubleshooting steps to be taken to address a performance issue with the DSL. For example, in one instance, the recommendation text that may state "DSL expert has detected a bridge tap of length 250 feet at a distance of 35 feet from the end of the test leads. Please remove the bridge tap to recover bandwidth and retest." FIG. 1E illustrates a listing of example recommendation text(s) 120 that may be provided via the instructions 108e. In particular, the recommendation text(s) 120 may include threshold determinations 121, suggestions 122 and recommended tests 123. FIG. 1F illustrates a listing of example recommendation text(s) 130 that may be provided via the instructions 108e. In particular, the recommendation text(s) 130 may include threshold determinations 131, suggestions 132 and recommended tests 133. FIG. 1G illustrates a listing of example recommendation text(s) 140 that may be provided via the instructions 108e. In particular, the recommendation text(s) 140 may include threshold determinations 141, suggestions 142 and recommended tests 143. FIG. 1H illustrates a listing of example recommendation text(s) 150 that may be provided via the instructions 108e. In particular, the recommendation text(s) 150 may include threshold determinations 151 and suggestions 152. It should be appreciated that to generate a recommendation, the instructions 108e may implement various fuzzy logic, machine-learning (ML) and artificial intelligence (AI) techniques.

In some examples, the instructions 108f may generate a user interface (UI) item to enable a user (e.g., a DSL technician) to view a recommendation. In some examples, the instructions 108f may generate a selectable "speech bubble" including recommendation text.

Figure 2A:
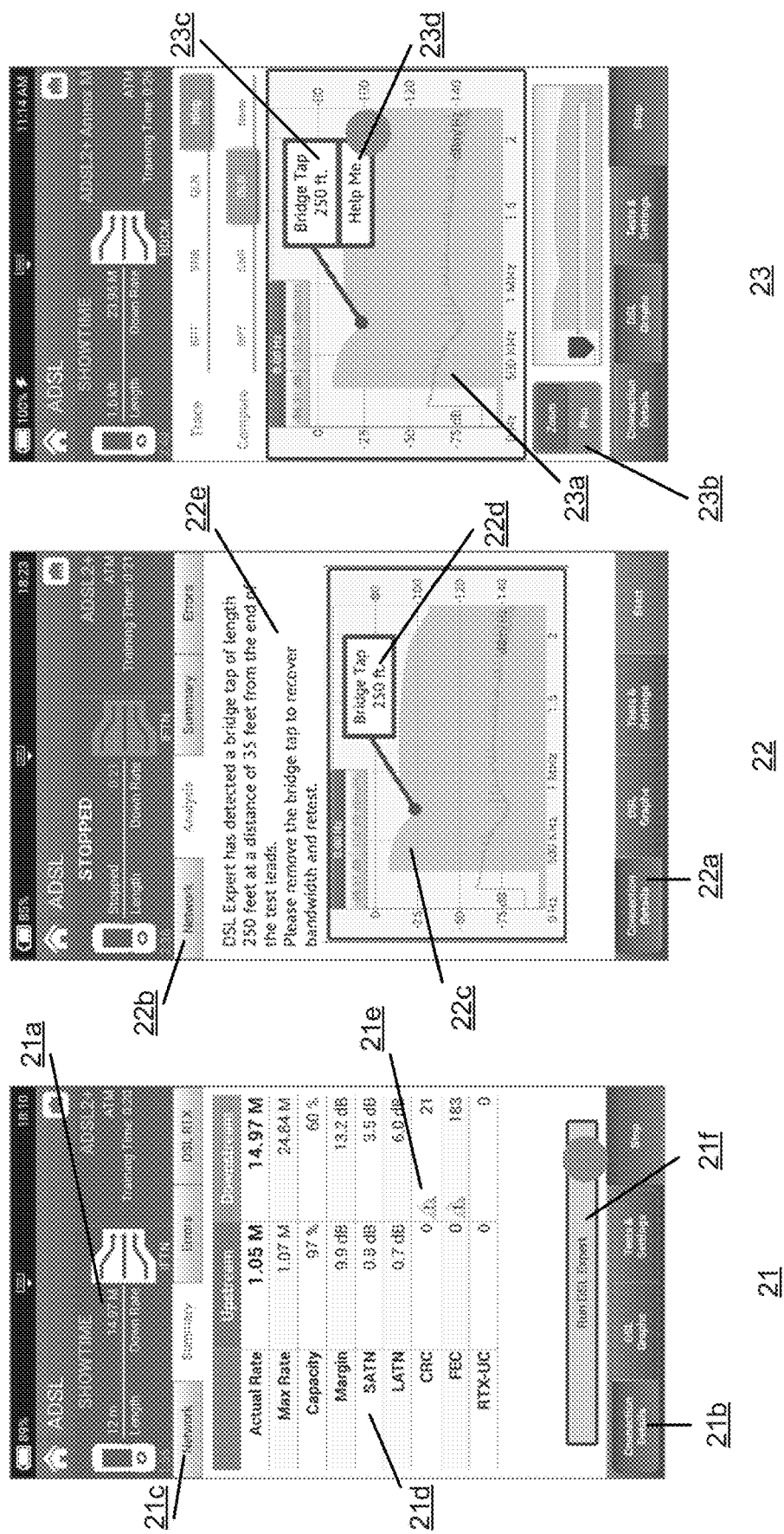
FIG. 2A-B illustrate user interfaces displays of a testing device, according to examples.
Figure 2B:
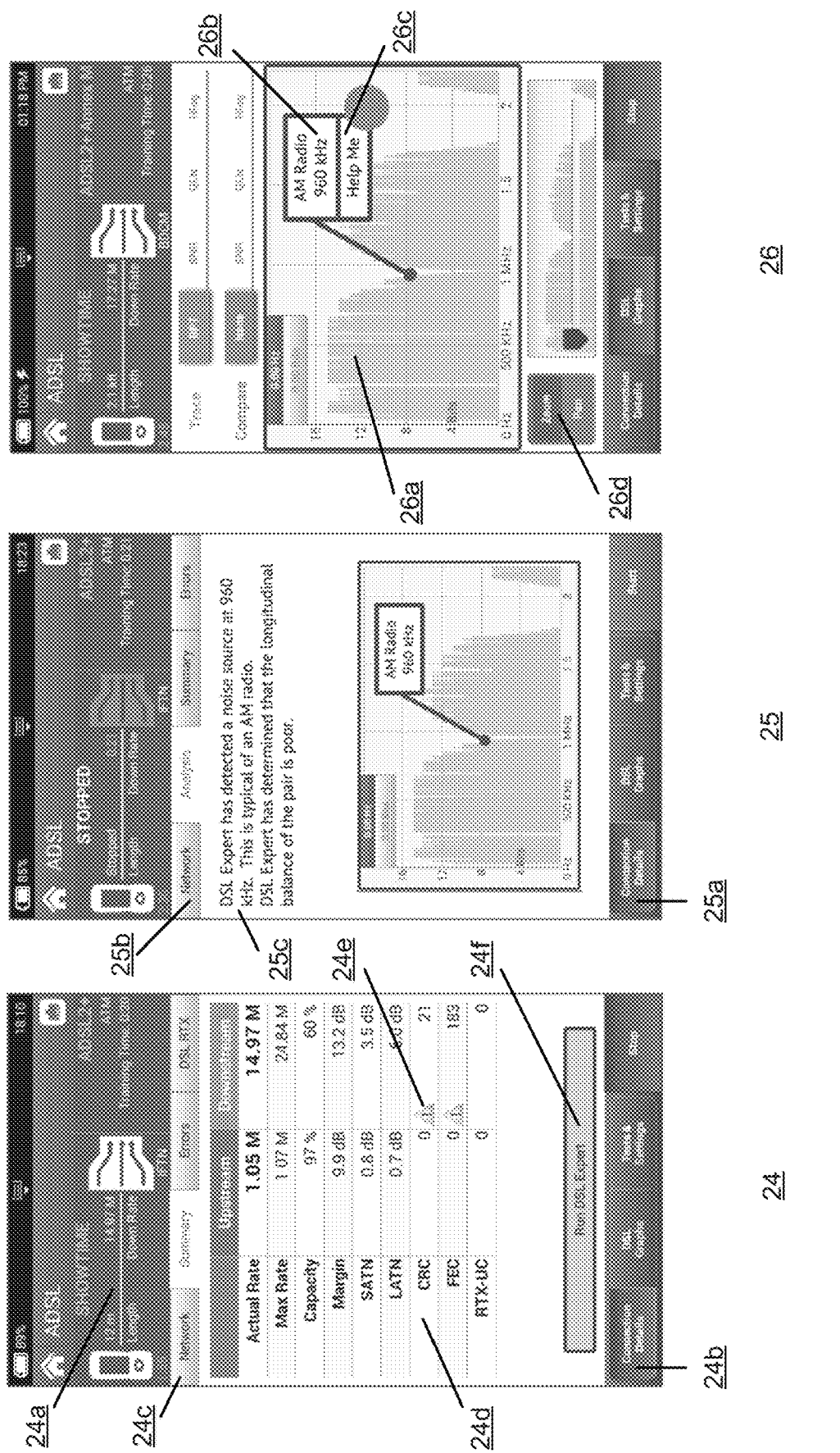

FIG. 2A-B illustrate user interface(s) from a testing device, such as the testing device 100, according to examples. FIG. 2A illustrates three example screenshots 21-23. In example screenshot 21, the UI may include a status portion 21a, which may provide basic information relating to the DSL, such as a state of a connection and how long the connection may have been active. The UI may also include one or more function tabs 2113 associated with testing and measurement of the DSL. In the example screenshot 21, the function tabs 21b may include "Connection Details", "DSL graphs", "Tests & Settings" and a "Start/Stop Function". The example screenshot 21 may further include measurement tabs 21c, which may include "Network", "Summary", "Errors" and DSL RTX" tabs. In addition, as shown in the example screenshot 21, the connection details may include a measurement data portion 21d, which may include readouts for various performance counters, such as signal to noise margin, signal attenuation (SATN), line attenuation (LATH), cyclic redundancy check (CRC), forward error correction (FEC), and uncorrected retransmissions (RtX-UC).

As discussed above, in some examples, the testing device 100 may compare performance counters with associated thresholds to determine presence of an anomalous performance event and, upon determining that a measured performance counter y have crossed a threshold, may provide a UI element indicating presence of an anomalous performance event. In this example, the anomalous performance event may be indicated by a UI element 21e, and may be represented by an "!". Also, as discussed above, upon determining presence of an anomalous performance event, the testing device 100 may enable an analysis mode to provide a recommendation. In this example, the analysis mode may be initiated via user selection of the "Run DSL Expert" button 21f.

In the example screenshot 22 may be shown upon the selection of the "Run DSL Expert button 21d in example screenshot 21. In this example, the example screenshot 22 may include functions tabs 22a, which may include "Connection Details", "DSL Graphs", "Tests and Settings" and "Start". In addition, the example screenshot 22 may include measurement tabs 22b, which may include "Network", "Analysis", Summary" and "Errors".

As shown, the example screenshot 22 may also include data graph 22c, which may include a text bubble 22d indicating a "bridge tap of" length 250 feet. In some examples, the data graph 22c may indicate a quiet line noise (QLN) versus signal-to-noise (SNR) per tone results. In some examples, the x-axis may indicate frequency, while the (left) y-axis may indicate a signal-to-noise (SNR) in decibels (dB) and the (right) y-axis may be the quiet line noise (QLN) level in dB/Hz. In some examples, this may indicate an anomaly that may result in lower data rates and/or error performance counters such as cyclic redundancy check (CRC), upstream and/or downstream forward error correction (FEC) may be incrementing. Also, in this example, the analysis mode of the testing device may make a determination based on a measured performance counter. As used herein, a determination based on a measured performance counter may include a determination of a basis of an anomalous performance event and/or an aspect of an anomalous performance event. So, in some examples, the analysis mode of the testing device may determine: 1) a bridge tap (i.e., a basis) may exist (i.e., an aspect), 2) a length (i.e., an aspect) of a bridge tap (i.e., a basis), and 3) a distance (i.e., an aspect) to the bridge tap (i.e., a basis). Furthermore, it may provide the recommendation text 22e which, in this example, may state "DSL expert has detected a bridge tap of length 250 feet at a distance of 35 feet from the end of the test leads. Please remove the bridge tap to recover bandwidth and retest."

As discussed above, in some examples, an analysis mode of a testing device may run continuously upon connection with the DSL. An example user interface of such as case is shown in the example screenshot 23. In this example, the example screenshot 23 may include a data graph 23a and a "zoom"/"pan" function 23b that may enable a user to view aspects of the data graph 23a in greater or lesser detail. In some examples, the example user interface may enable a user to ask for assistance in resolving an identified bridge tap by selecting a text bubble. In this example, the data graph 23a may include a first text bubble 23c ("Bridge tap 250 ft,") to indicate a distance of a bridge gap and a second text bubble 23d ("Help me") to enable a user to receive a recommendation. Upon user selection of the second text bubble 23d by the user, the analysis mode of the testing device may be initiated, and may provide a recommendation similar to that shown in screenshot 22.

FIG. 2B illustrates three example screenshots 24-26. In example screenshot 24 in FIG. 2B, similar to the example in FIG. 2A, the UI may include a status portion 24a, function tabs 24b, measurement tabs 24c, and a measurement data portion 24d. Also, upon determining that a measured performance counter may have crossed a threshold, the testing device may provide a UI element 24e indicating presence of an anomalous performance event. Furthermore, as discussed above, upon determining presence of an anomalous performance event, the testing device may enable an analysis mode to provide a recommendation that may be initiated upon user selection of the "Run DSL Expert" button 24f.

In the example screenshot 25, upon the selection of the "Run DSL Expert button 24d, function tabs 25a and measurement tabs 25b. As shown, the "Analysis" measurement tab of the measurement tabs 25b may include recommendation text 25c. In this example, the recommendation text 25c may state "DSL expert has detected a noise source at 960 kHz. This is typical of an AM radio. DSL expert has determined that the longitudinal balance of the pair is poor," So, in this example, the analysis mode of the testing device may determine: 1) a noise source may exist at 960 kHz, 2) the noise source may be an AM radio, and 3) that a longitudinal balance associated with a copper pair may be poor.

In the instance where an analysis mode of a testing device may run continuously upon connection with the DSL, an example user interface of such may be shown in the example screenshot 26, including a data graph 26a, Similar to the example in FIG. 2A, the analysis mode of the testing device may make a determination based on a measured performance counter, which may include a determination of an basis of an anomalous performance event and/or an aspect of an anomalous performance event. In some examples, the data graph 26a may indicate a bits per tone (BPT) graph for a connection that may be impacted by an external noise source (e.g., an AM radio station broadcasting at 960 kHz), In some examples, the x-axis may indicate frequency while the y-axis may indicate a number of bits available in each carrier. In some examples, a disturber may typically result in "notched out" or unusable spectrum (as illustrated in the data graph 26a) that may be centered at and on both sides of a disturber. In some examples, this type of disturber may result in lower data rates and/or error performance counters such as cyclic redundancy check (CRC) and forward error correction (FEC). So, in this example, the example screenshot 26 may also include a first text bubble 26b ("AM Radio 960 kHz") a second text bubble 26c ("Help me") and a "zoom"/"pan" function 26d. The first text bubble indicating an "AM Radio 960 Hz" may indicate a basis for an anomalous performance event. Moreover, upon user selection of the second text bubble 26c, the analysis mode of the testing device may be initiated, and may invoke a user interface similar to that shown in example screenshot 25.

5. Methods

Figure 3:
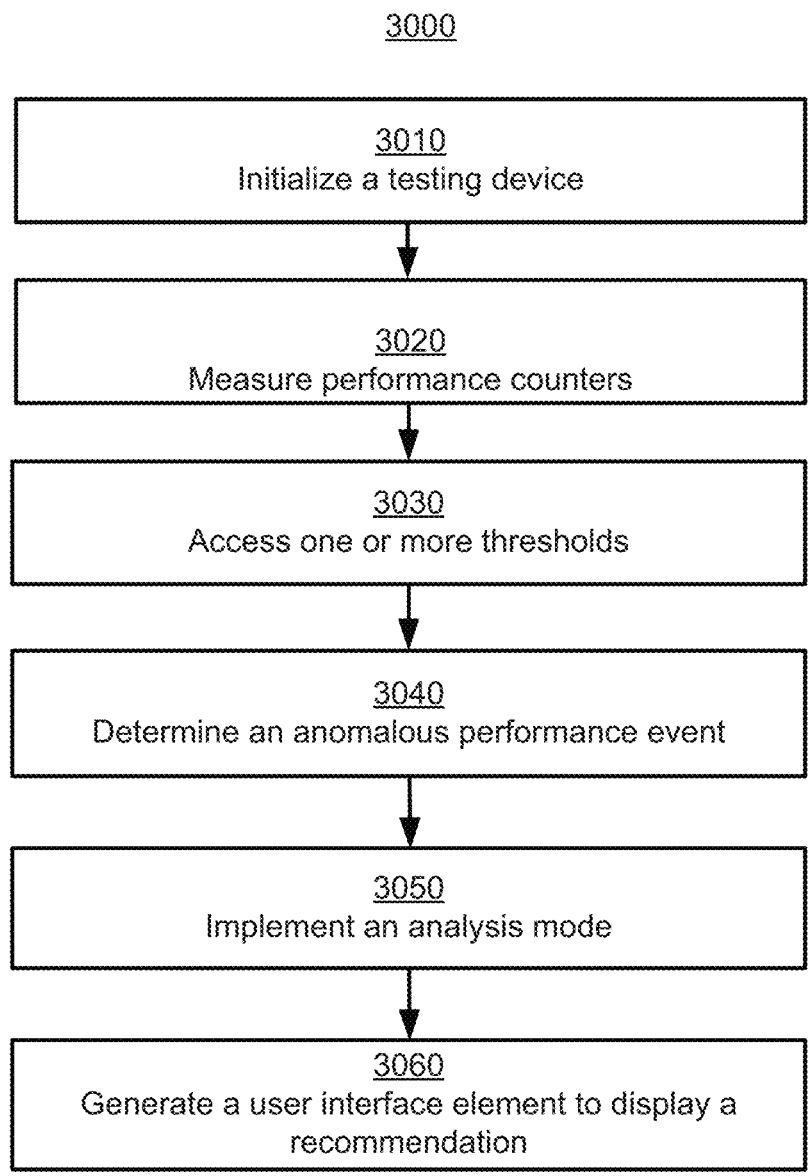
FIGS. 3-4 illustrate methods for measuring and analyzing data for generating recommendations associated with a DSL, according to an example.

FIG. 3 illustrates a method for measuring and analyzing data for generating recommendations associated with a DSL, according to an example. The method 3000 is primarily described as being performed by the testing system 100 shown in FIGS. 1A-C. However, the method 3000 may be executed or otherwise performed by other systems, or a combination of systems. Also, each block shown in FIG. 3 may further represent one or more processes, methods, or subroutines, and one or more of the blocks may include machine-readable instructions stored on a non-transitory computer-readable medium and executed by a processor or other type of processing circuit to perform one or more operations described herein.

At 3010, the processor 107 may initialize a testing device (e.g., the testing device 100) prior to testing.

At 3020, the processor 107 may measure performance counters associated with a DSL (e.g., the DSL 10). In particular, a DSL technician may utilize a physical connector (e.g., the physical connector 101) to connect the DSL.

At 3030, the processor 107 may access one or more thresholds associated with a DSL. In some examples, the testing device may access one or lore thresholds that may be provided by a user (e.g., a DSL service provider) or may be generated based on performance counters.

At 3040, the processor 107 may determine an anomalous performance event with the DSL. In some examples, this may include comparing performance counters and their associated thresholds, Upon determination of the anomalous performance event, the processor 107 may generate an notification UI element for display.

At 3050, the processor 107 may implement an analysis mode of the testing device. As discussed above, the processor may implement the analysis mode to determine a performance issue with the DSL and to generate a corresponding recommendation. To determine the issue and generate the recommendation, the processor 107 may analyze one or more measured performance counters, enable one or more testing protocols and utilize key performance indicators (KPIs) associated with an anomalous performance event. In some examples, the 107 processor may provide a selectable user interface element, such as a "Run DSL button", to enable the analysis mode.

At 3060, the processor 107 may generate a user interface element to display a recommendation generated via an analysis mode. In some examples, the user interface element may include recommendation text that may suggest troubleshooting steps to be taken to address a performance issue with the DSL.

Figure 4:
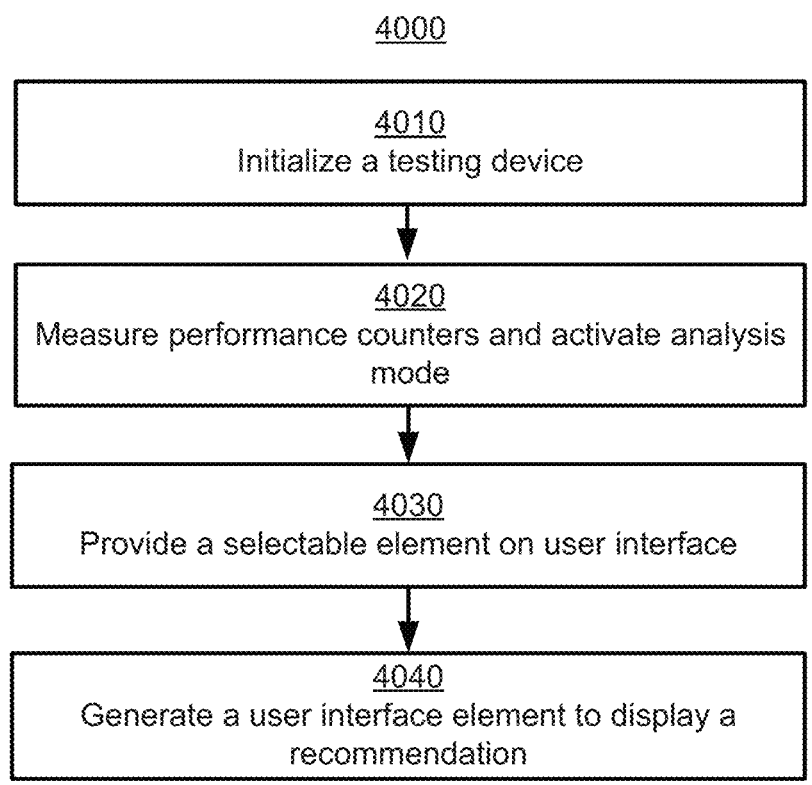

FIG. 4 illustrates a method for measuring and analyzing data for generating recommendations associated with a DSL, according to an example. The method 4000 is primarily described as being performed by the testing system 100 shown in FIGS. 1A-C. However, the method 4000 may be executed or otherwise performed by other systems, or a combination of systems. Also, each block shown in FIG. 4 may further represent one or more processes, methods, or subroutines, and one or more of the blocks may include machine-readable instructions stored on a non-transitory computer-readable medium and executed by a processor or other type of processing circuit to perform one or more operations described herein.

At 4010, the processor 107 may initialize a testing device (e.g., the testing device 100) prior to testing.

At 4020, the processor 107 may connect to the DSL and may begin measuring performance counters associated with a DSL, such as the DSL 10. Moreover, in some examples, a user (e.g., a DSL technician) may activate an analysis mode on the device immediately upon connection, and the analysis mode may operate "in the background" to determine a performance issue with the DSL and generate a recommendation.

At 4030, the 107 processor may provide a selectable element on a user interface, such as a "Help me" button", to enable a user to view a recommendation. In one example, the selectable element may be located on a data graph displayed in a tab.

At 4040, the processor 107 may generate a user interface element to display a recommendation. In some examples, the user interface element may include recommendation text that may suggest troubleshooting steps to be taken to address a performance issue with the DSL.

Although the methods and systems as described herein may be directed mainly to digital content, such as videos or interactive media, it should be appreciated that the methods and systems as described herein may be used for other types of content or scenarios as well. Other applications or uses of the methods and systems as described herein may also include social networking, marketing, content-based recommendation engines, and/or other types of knowledge or data-driven systems.

The invention claimed is:

1. A testing device operable to measure and analyze performance counters and to determine an issue with a digital subscriber line (DSL), the testing device comprising:
   a display;
   a battery module;
   a transceiver;
   a physical connector;
   a first measurement circuit to measure and analyze modem-based measurements associated with the DSL;
   a second measurement circuit to measure and analyze copper wire-based measurements associated with the DSL; and
   a processor to:
      access thresholds associated with the performance counters;
      detect an anomalous performance event based on the performance counters and the thresholds; and
      enable an analysis mode to determine the issue with the DSL and to generate a recommendation to address the issue with the DSL, wherein enabling the analysis mode includes implementing an analysis sequence comprising one or more testing protocols to:
  follow an issue associated with a modem-based connection of the DSL through a DSL layer stack;
  determine a performance counter for a copper wire connection of the DSL related to the issue associated with the modem-based connection, wherein the performance counter for the copper wire connection of the DSL is included in the performance counters; and
  determine a corresponding performance issue with the copper wire connection of the DSL utilizing the performance counter for the copper wire connection of the DSL.

2. The testing device of claim 1, wherein the processor is further to initialize the testing device.

3. The testing device of claim 1, wherein the thresholds include user-based thresholds and analysis-based thresholds.

4. The testing device of claim 1, wherein the performance counters include one or more of upstream and downstream cyclical redundancy check (CRC), upstream and downstream forward error correction (FEC), upstream and downstream errored seconds (ES), upstream and downstream uncorrected retransmissions (RTX-UC), upstream and downstream severely errored seconds (SES), upstream and downstream unavailable seconds (UAS), upstream and downstream loss of frame (LOF), upstream and downstream loss of signal (LOS) and upstream and downstream loss of margin (LOM).

5. The testing device of claim 1, wherein the processor is further to provide a notification element on the display to indicate the anomalous performance event.

6. The testing device of claim 1, wherein the anomalous performance event is related to one of a modem line of the DSL and a modem connection of the DSL.

7. The testing device of claim 1, wherein to determine the issue with the DSL, the processor is further to:
  implement a testing protocol of the one or more testing protocols to generate a testing protocol result; and
  compare a key performance indicator (KPI) to the testing protocol result.

8. The testing device of claim 1, wherein to follow the issue associated with the DSL through the DSL layer stack to determine the corresponding performance issue with the copper wire connection of the DSL, the processor is further to determine an associated performance counter associated with a copper line connection.

9. A method for measuring and analyzing performance counters and determining an issue with a digital subscriber line (DSL), the method comprising:
  measuring and analyzing measurement data associated with the performance counters;
  accessing thresholds associated with the performance counters;
  detecting an anomalous performance event based on the performance counters and the thresholds; and
  enabling an analysis mode of a testing device, including:
    generating a data graph utilizing the measurement data;
    determining one or more features of the data graph;
    analyzing feature data associated with the one or more features of the data graph;
    determining the issue with the DSL based on the analyzing of the feature data;
    implementing an analysis sequence including one or more testing protocols to follow an issue associated with a modem-based connection of the DSL through a DSL layer stack;
    determining a performance counter for a copper wire connection of the DSL related to the issue associated with the modem-based connection, wherein the performance counter for the copper wire connection of the DSL is included in the performance counters;
    determining a corresponding performance issue with the copper wire connection of the DSL utilizing the performance counter for the copper wire connection of the DSL; and
    generating a recommendation to address the issue with the DSL.

10. The method of claim 9, wherein the measurement data includes modem-based measurements and copper wire-based measurements.

11. The method of claim 9, wherein the one or more features of the data graph include one or more of a dip in the data graph, a curve in the data graph or a length in the data graph.

12. The method of claim 9, wherein the performance counters include one or more of upstream and downstream cyclical redundancy check (CRC), upstream and downstream forward error correction (FEC), upstream and downstream errored seconds (ES), upstream and downstream uncorrected retransmissions (RTX-UC), upstream and downstream severely errored seconds (SES), upstream and downstream unavailable seconds (UAS), upstream and downstream loss of frame (LOF), upstream and downstream loss of signal (LOS) and upstream and downstream loss of margin (LOM).

13. The method of claim 9, further comprising providing a notification element on a display to indicate the anomalous performance event.

14. The method of claim 9, wherein the anomalous performance event is related to one of a modem line of the DSL and a modem connection of the DSL.

15. A testing device operable to measure and analyze performance counters and determine an issue with a digital subscriber line (DSL), the testing device comprising:
  a display;
  a battery module;
  a transceiver;
  a physical connector;
  a first measurement circuit to measure and analyze modem-based measurements associated with the DSL;
  a second measurement circuit to measure and analyze copper wire-based measurements associated with the DSL; and
  a processor to:
    access the modem-based measurements and the copper wire-based measurements based on thresholds associated with the performance counters;
    detect an anomalous performance event based on the performance counters and the thresholds; and
    determine the issue with the DSL, wherein the processor is further to:
      implement an analysis sequence including one or more testing protocols to follow an issue associated with a modem-based connection of the DSL through a DSL layer stack;
      generate a testing protocol result, wherein implementing the one or more testing protocols includes:

determine a performance counter for a copper wire connection of the DSL related to the issue associated with the modem-based connection, wherein the performance counter for the copper wire connection of DSL is included in the performance counters;

compare a key performance indicator (KPI) to the testing protocol result;

determine a corresponding performance issue with the copper wire connection of the DSL utilizing the performance counter for the copper wire connection of the DSL; and generate a recommendation to address the issue with the DSL.

16. The testing device of claim 15, wherein the thresholds include user-based thresholds and analysis-based thresholds.

17. The testing device of claim 15, wherein the performance counters include one or more of upstream and downstream cyclical redundancy check (CRC), upstream and downstream forward error correction (FEC), upstream and downstream errored seconds (ES), upstream and downstream uncorrected retransmissions (RTX-UC), upstream and downstream severely errored seconds (SES), upstream and downstream unavailable seconds (UAS), upstream and downstream loss of frame (LOF), upstream and downstream loss of signal (LOS) and upstream and downstream loss of margin (LOM).

18. The testing device of claim 15, wherein the anomalous performance event is related to one of a modem line of the DSL and a modem connection of the DSL.

19. The testing device of claim 15, wherein the processor is further to provide a notification element to indicate the anomalous performance event.

20. The testing device of claim 15, wherein the recommendation includes recommendation text providing troubleshooting steps to remove the issue with the DSL.

* * * * *